United States Patent [19]

Okamoto et al.

[11] Patent Number: 4,758,907

[45] Date of Patent: Jul. 19, 1988

[54] METHOD AND APPARATUS FOR RECORDING AND/OR REPRODUCING PCM SIGNALS

[75] Inventors: Hiroo Okamoto; Masaharu Kobayashi; Takaharu Noguchi, all of Yokohama, Japan

[73] Assignee: Hitachi, Ltd., Tokyo, Japan

[21] Appl. No.: 850,110

[22] Filed: Apr. 10, 1986

[30] Foreign Application Priority Data

Apr. 10, 1985 [JP] Japan .................................. 60-74234

[51] Int. Cl.⁴ ......................... G11B 5/09; G11B 5/00
[52] U.S. Cl. ........................................ 360/48; 360/32
[58] Field of Search ................ 360/39, 32, 48; 369/59

[56] References Cited

U.S. PATENT DOCUMENTS 4,617,599 10/1986 Noguchi et al. ....................... 360/32

FOREIGN PATENT DOCUMENTS

| 129224 | 12/1984 | European Pat. Off. . |
| 137855 | 4/1985 | European Pat. Off. . |
| 146639 | 7/1985 | European Pat. Off. . |
| 155664 | 9/1985 | European Pat. Off. . |
| 188314 | 4/1983 | Japan . |
| PCT 313 | 9/1984 | PCT Int'l Appl. . |
| 2140178 | 11/1984 | United Kingdom . |

OTHER PUBLICATIONS

"Sound PCM Decoders LSI's for Japanese DBS", by H. Ukai et al., IEEE, vol. CE 31 H 1, 2/85.

Primary Examiner—Vincent P. Canney
Attorney, Agent, or Firm—Antonelli, Terry & Wands

[57] ABSTRACT

When a PCM signal having a sampling frequency of 32 KHz, a quantization of 12 bits per sample, and 4 channel is to be recorded onto tape, the PCM signal undergoes, prior to being recorded onto the tape, such predetermined data dispersion that burst errors incurred in the reproduction operation may be compensated.

10 Claims, 9 Drawing Sheets

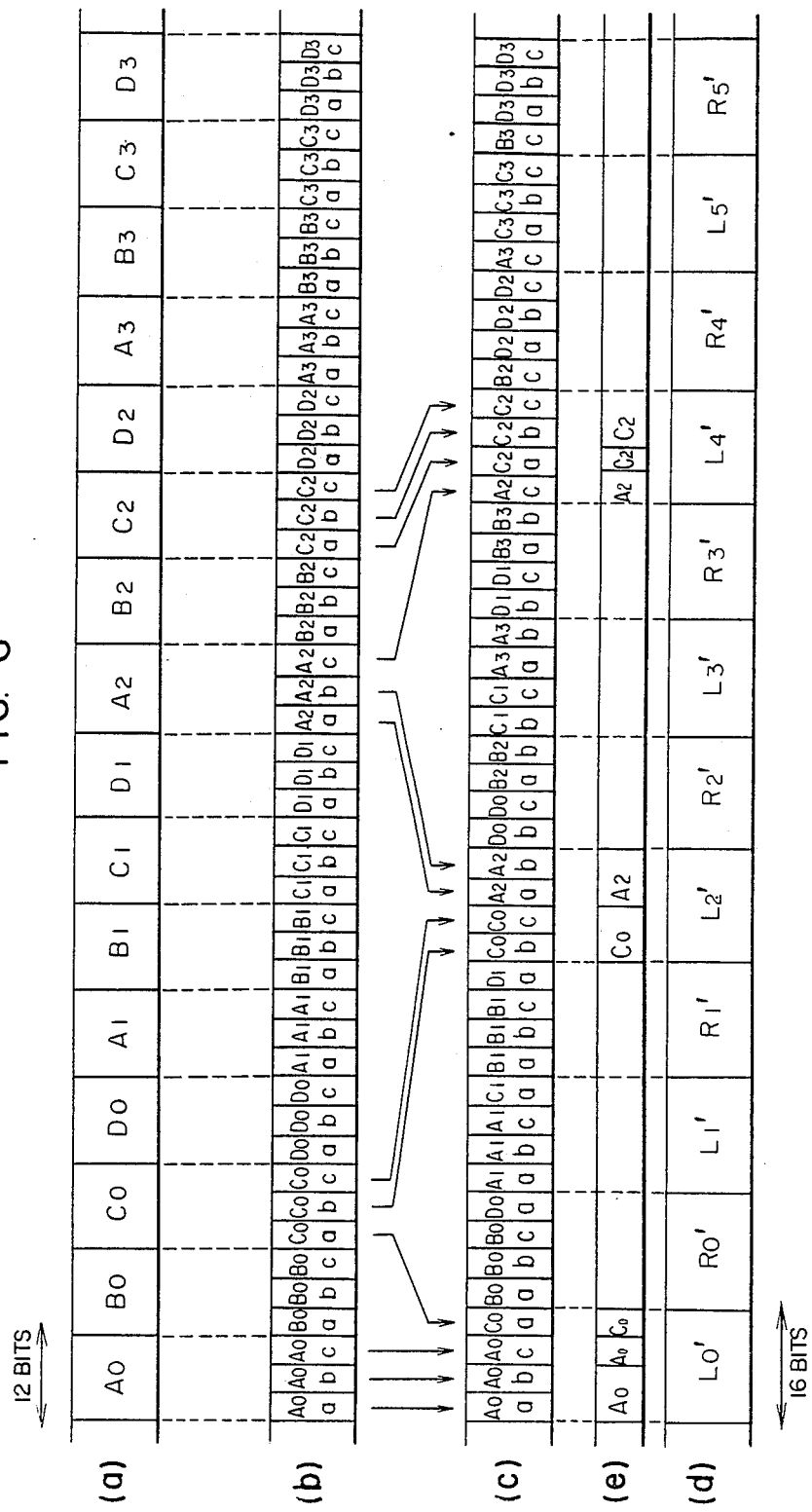

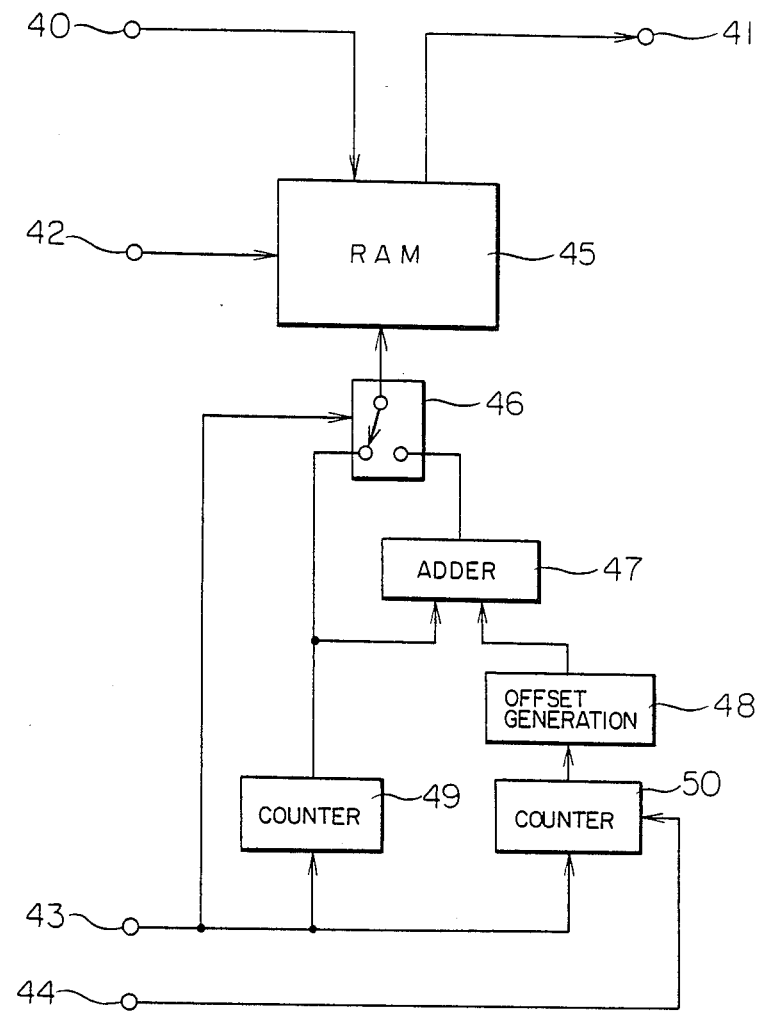

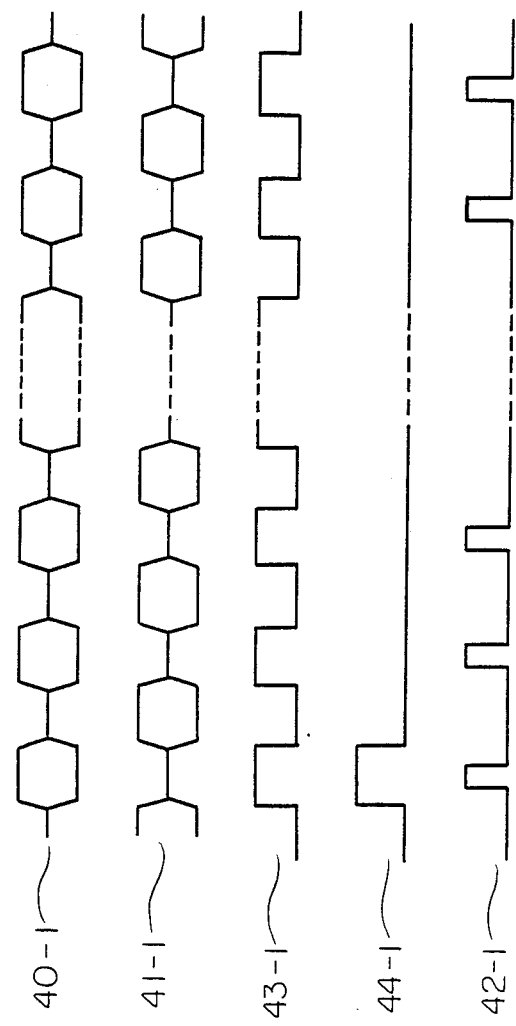

1

METHOD AND APPARATUS FOR RECORDING AND/OR REPRODUCING PCM SIGNALS

BACKGROUND OF THE INVENTION

The present invention relates to a recording and/or reproducing technique for PCM signals, and in particular to a PCM signal recording and/or reproducing method and apparatus suitable for recording and/or reproducing audio PCM signals onto and/or from a digital audio tape recorder (hereafter referred to as DAT).

The DAT for converting an audio signal into PCM signals and recording the PCM signals onto a magnetic tape is excellent in tone quality and free from quality deterioration caused by the recording and reproducing operation.

A technical trend in the development of the rotary-head type digital audio tape recorder (hereafter referred to as R-DAT) is described in "DAT Meeting Activity" on pages 36-42, particularly pages 40-42 of ELECTRONICS, vol. 24, No. 10, 1984 published by EIAJ (Electronics Industries Association of Japan).

As described on page 40 of the above described literature, the first PCM signal having a sampling frequency of 48 KHz, a quantization of 16 bits per sample, and two channels 2 (left and right) was recorded onto tape as an experimental format of the R-DAT. The first PCM signal corresponds to the B-mode specification in the PCM signal transmission of the satellite broadcast in Japan.

FIG. 2 shows a record pattern on the magnetic tape of the R-DAT described on page 41 of the aforementioned literature. On the magnetic tape 33, blocks of the above described first PCM signal are recorded alternately on a plus azimuth track 34 and on a minus azimuth track 35. The head gaps of heads 32a and 32b shown in FIG. 1 are slanted with respect to a face perpendicular to the record direction as indicated by oblique lines of FIG. 2. Accordingly, the first PCM signal is also recorded in the directions indicated by oblique lines of FIG. 2. These tracks are referred to as azimuth tracks. The terms "plus azimuth" and "minus aximuth" mean that the oblique directions of tracks 34 and 35 are opposite each other as illustrated by oblique lines.

FIGS. 3 and 4 show the configuration of an example of PCM data recorded on respective tracks of FIG. 2. FIG. 3 shows the data arrangement on the plus azimuth track 34 of FIG. 2. FIG. 4 shows the data arrangement on the minus aximuth track 35 of FIG. 2. Numeral 36 denotes one symbol unit which consists of 8 bits. Usually, one-word signal comprises two symbols, an upper symbol and a lower symbol. One block comprises 32 symbols and 128 blocks are recorded on one track. Numeral 38 denotes a first error detection and correction code Q and numeral 37 denotes a second error detection and correction code P. Letter L represents left channel data and letter R represents right channel data. The suffix following L or R represents a serial number of the left channel data or right channel data. The suffix 0, 2, 4, . . . represents even-numbered data and the suffix 1, 3, 5, . . . represents odd-numbered data. Letter U represents the above described upper symbol and letter l represents the above described lower symbol.

Data dispersion is conducted in data recording so that error compensation may be effected by means of mean value interpolation even if a large burst error occurs in data reproduction. That is to say, even-numbered data of the left channel is recorded on former halves of plus azimuth tracks and odd-numbered data of the left channel is recorded on latter halves of minus azimuth tracks. Similarly even-numbered data of the right channel is recorded on former halves of minus azimuth tracks and odd-numbered data of the right channel is recorded on latter halves of plus azimuth tracks. Examples of this arrangement will now be described by referring to FIGS. 3 and 4. Even-numbered data Lou of the left channel is indicated on block No. 0 of FIG. 3. This fact means that the data Lou is recorded on the former half of the plus azimuth track 34 of FIG. 2 with respect to the record direction. Data L1u following the data Lou is indicated on block No. 76 of FIG. 4. This fact means that the data L1u is recorded on the latter half of the minus azimuth track 35 with respect to the record direction. The even-numbered data Lou of the left channel and the even-numbered data Ro1 of the right channel corresponding thereto are disposed on the same block number 0 at an interval of one symbol. Since the sampling frequency is 48 KHz and the number of rotations of the cylinder is 2,000 rpm in the rotary-head type DAT, data of 5760 symbols are recorded on two tracks.

In an R-DAT, the data arrangement was so designed that the first PCM signal having a sampling frequency of 48 KHz, a quantization of 16 bits per sample, and the two channels (left and right) would be optimally recorded. However, practical consideration was not given to the recording arrangement for the second PCM signal which is different from the above described PCM signal in sampling frequency, the number of quantized bits per sample, and the number of channels. An example of the second PCM signal source corresponds to the A-mode specification in the PCM signal transmission of the satellite broadcast in Japan.

SUMMARY OF THE INVENTION

An object of the present invention is to provide a method and an apparatus for recording and/or reproducing PCM signals capable of recording the second PCM signal source which is different in sampling frequency, the number of quantized bits per sample, and the number of channels.

In accordance with the present invention, words of a PCM signal which is different in sampling frequency, the number of quantized bits per sample, and the number of channels are interchanged in a predetermined sequence while taking a fixed number of words as a unit in order to effect recording in a data arrangement optimum with respect to burst errors.

BRIEF DESCRIPTION OF THE DRAWINGS

FIGS. 3 and 4 show the configuration of recorded data of the prior art.

FIGS. 6a through e shows the conversion of input and output data according to the present invention.

FIG. 9 shows the configuration of a data conversion circuit.

FIG. 10 shows a timing chart of the circuit illustrated in FIG. 9.

DESCRIPTION OF THE PREFERRED EMBODIMENTS

Figure 1:
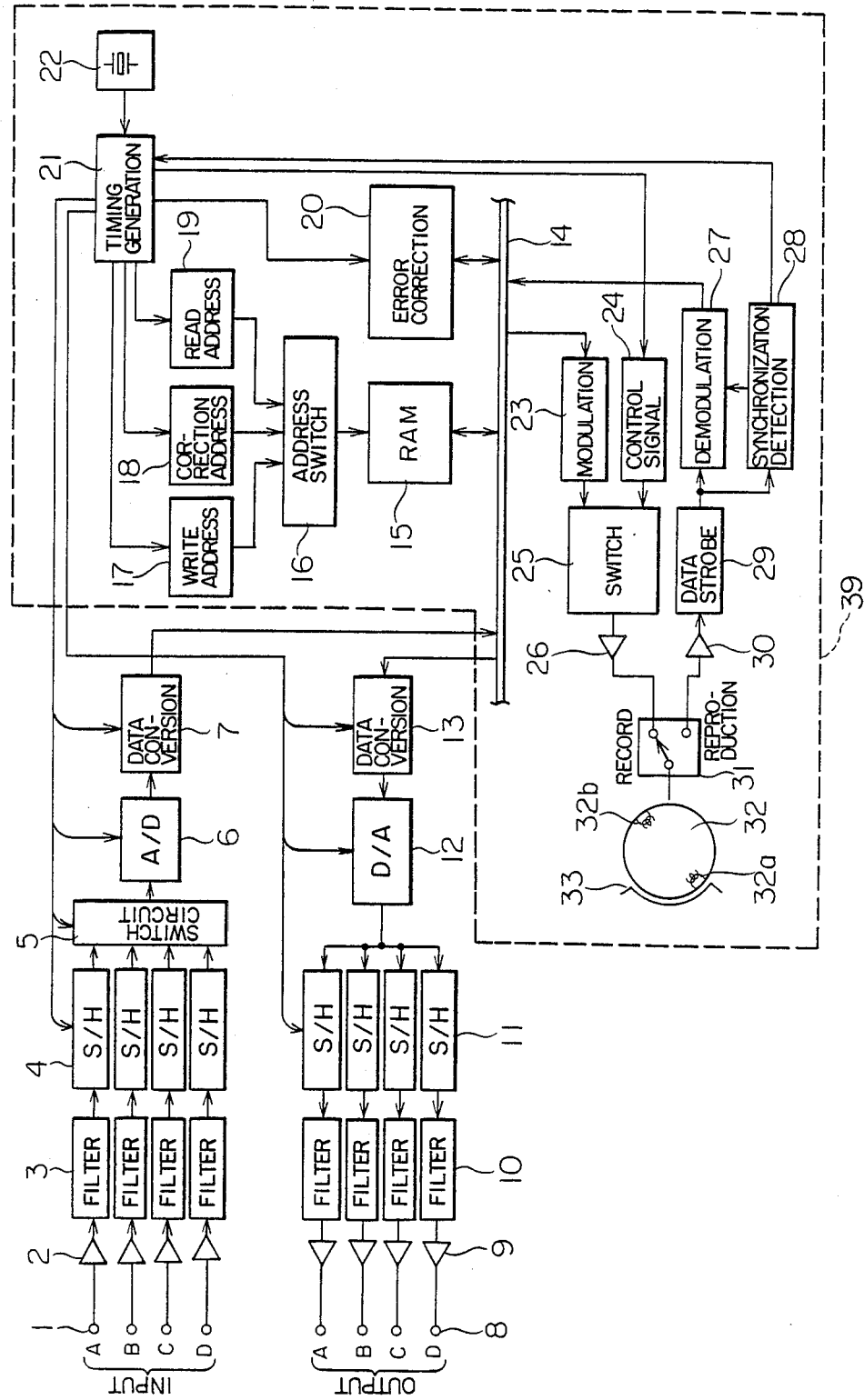
FIG. 1 shows the configuration of a PCM signal recording and reproducing apparatus according to the present invention.

An embodiment of the present invention will now be described by referring to FIG. 1. FIG. 1 shows a configuration of an R-DAT.

Figure 3:
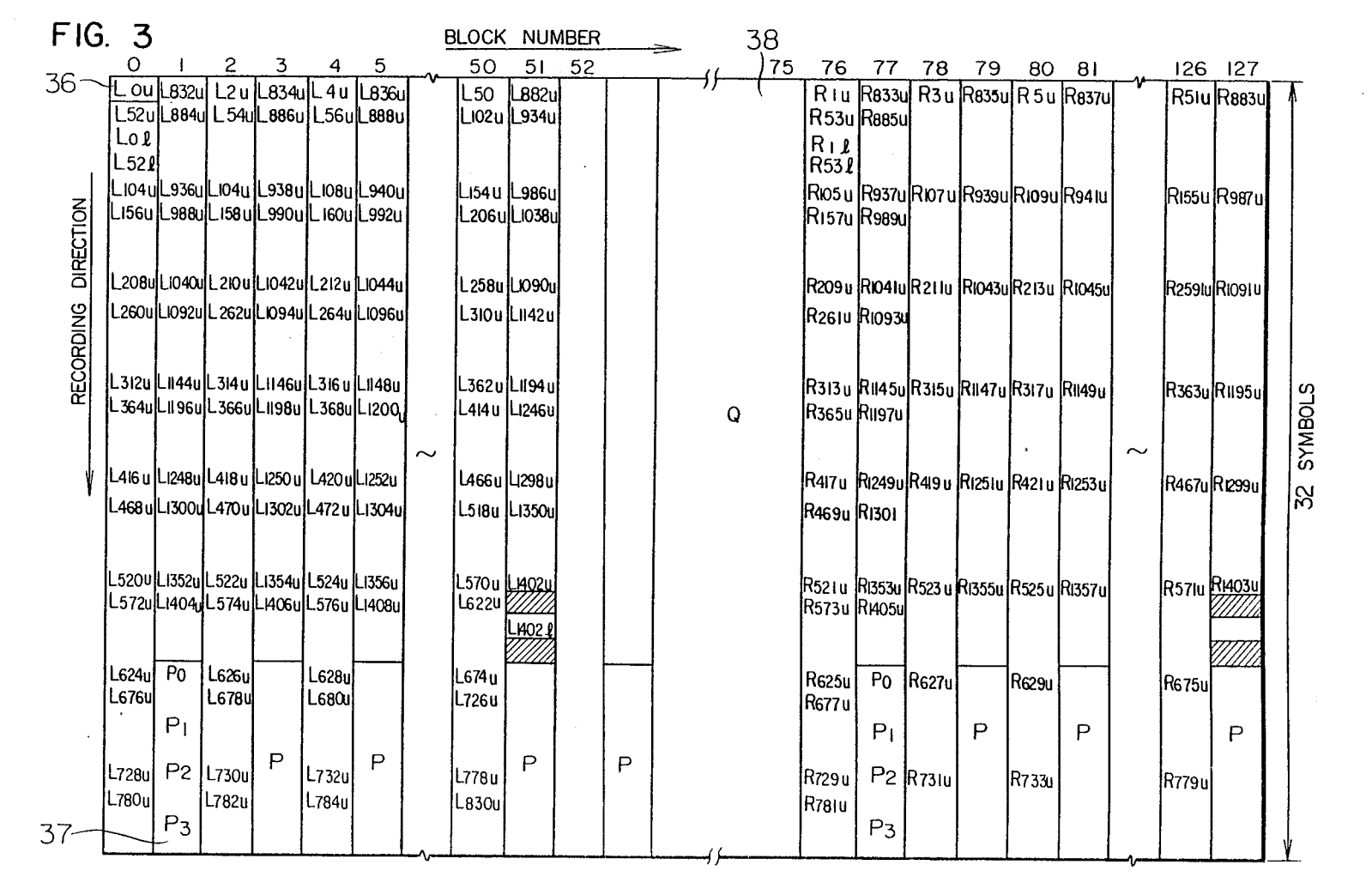
Figure 4:
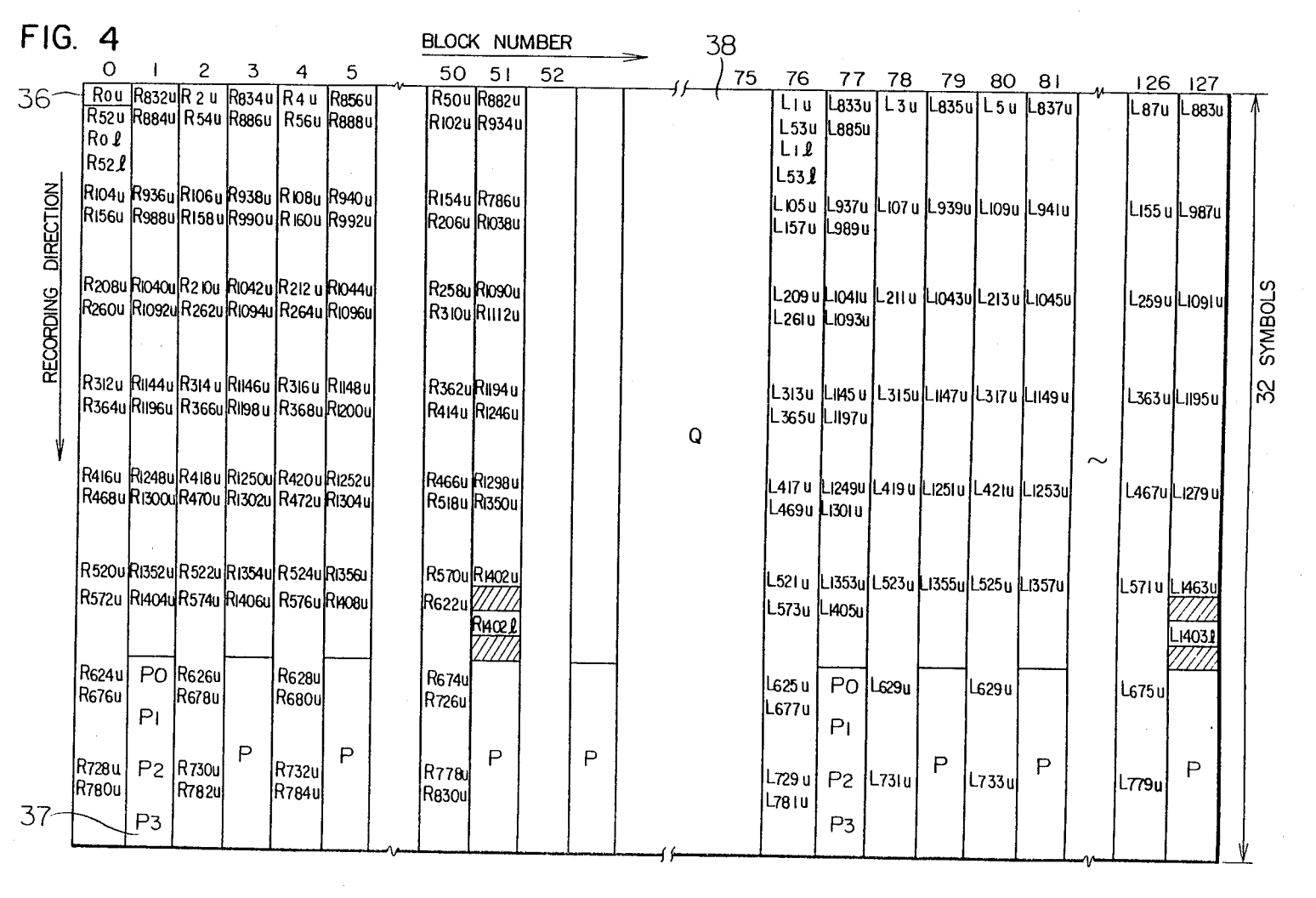

In recording operation, analog signals of four channels A, B, C and D are supplied from an input-terminal 1. The input signal is amplified to a predetermined level by an amplifier circuit 2, limited in bandwidth by a filter 3, and sampled by a sample and hold circuit 4. Input signals thus sampled are successively supplied to an A/D converter 6 through a switch circuit 5 to be converted into PCM signals. The PCM signals supplied from the A/D converter 6 undergo interchange according to a predetermined sequence in a data conversion circuit 7 and are written into a RAM 15 through a bus line 14. The PCM signals are exchanged between the RAM 15 and the error correction circuit 20, and error correction codes for detecting and correcting errors in the reproduction operation are added to the PCM signals. The address of the RAM 15 is controlled by address generation circuits 17 to 19 and an address switch circuit 16 to arrange PCM signals according to the above described format illustrated in FIGS. 3 and 4. After error correction codes are added to PCM signals and PCM signals are rearranged, data is read out of the RAM 15 block by block and modulated by a modulation circuit 23. Control signals such as synchronization signals are added to the modulated data by a control signal generation circuit 24 and a switch circuit 25. The resultant data are amplified to a predetermined level by a record amplifier 26 and supplied to a rotary head 32 through a switch circuit 31 to be recorded on the magnetic tape 33. The switch circuit 31 is changed over between the record operation and reproduction operation. A timing generation circuit 21 generates timing signals for controlling the entire circuit (blocks 4 to 7, 11 to 13 and 17 to 20), on the basis of clock pulses generated by an oscillation circuit 22.

In the reproduction operation, the switch circuit 31 is changed over to the reproduction position. Signals reproduced by the rotary head 32 are supplied to a reproduction amplifier 30 to undergo amplification and waveform equalization. After the resultant signals are converted into digital signals by a data strobe circuit 29, data demodulation and synchronization signal detection are effected by a demodulation circuit 27 and a synchronization detection circuit 28, respectively. The synchronization signal thus detected is used as a reference for data reproduction. The data demodulated by the demodulation circuit 27 is stored into the RAM 15 through the bus line 14 and thereafter is subjected to data rearrangement by the address generation circuits 17 to 19 and the address switch circuit 16 and error correction by the error correction circuit 20. The resultant data is supplied to a data conversion circuit 13 through the bus line 14. In the data conversion circuit 13, the data undergoes data interchange which is reverse to that effected in the data conversion circuit 7. The PCM signals rearranged in time series sequence are successively converted into analog signals by a D/A converter 12 and resampled for respective channels by a sample and hold circuit 11. The resampled analog signal of each channel is sent out from an output terminal 8 through a filter 10 and an amplifier circuit 9.

A part 39 of FIG. 1 surrounded by a broken line is so configured as to be suitable for recording the above described first PCM signal having a sampling frequency of 48 KHz, a quantization of 16 bits per sample, and two channels. In accordance with the present invention, it is possible to record the above described second PCM signal having a sampling frequency of 32 KHz, a quantization of 12 bits per sample, and four channels as a result of provision of blocks 1 to 4 and 8 to 11 of the channels C and D as well as the data conversion circuits 7 and 13.

Figure 2:
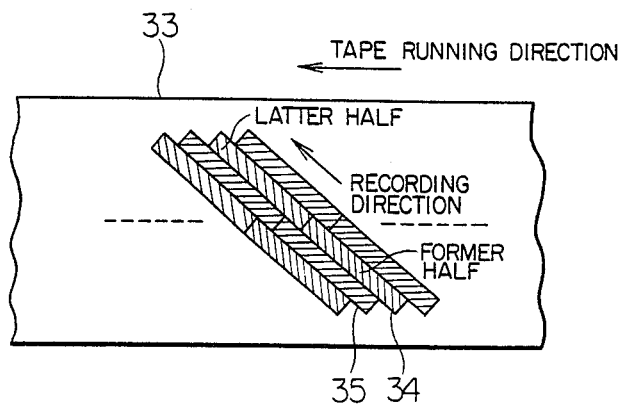
FIG. 2 shows a record pattern on magnetic tape.
Figure 5:
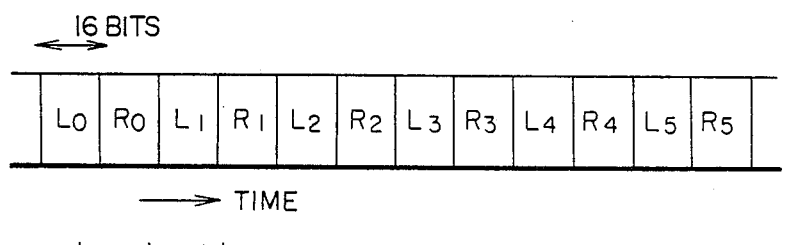
FIG. 5 shows the configuration of input and output data of the prior art.

At first, FIG. 5 will now be described. FIG. 5 shows the output data sequence of the A/D converter 6 when the above described first PCM signal source having two channels (left and right) is recorded. The subscript represents the order of each data word in a time series and is supplied to each word composed of 16 bits. This output data is then transmitted to the RAM 15. In the RAM 15, the PCM signals thus supplied are rearranged so that even-numbered data and odd-numbered data of each channel may be disposed on different tracks and also separated in the track direction as described before with reference to FIGS. 3, 4 and 2.

When the second PCM signal having a sampling frequency of 32 KHz, a quantization of 12 bits per sample, and four channels is to be recorded, however, the sequence of the output data of the A/D converter 6 becomes as shown in FIG. 6(a). It is also possible to record the second PCM signal without effecting interchange because the second PCM signal has as many data bits per unit time as the above described first PCM signal having a sampling frequency of 48 KHz, a quantization of 16 bits per sample, and two channels. In this case, however, even-numbered data positions and odd-numbered data positions of each channel do not correspond to even-numbered positions and odd-numbered positions of the left channel data and the right channel data as illustrated in FIG. 5. Accordingly, it is not possible to dispose even-numbered data apart from odd-numbered data as described before. In an embodiment of the present invention, therefore, data interchange as illustrated in FIGS. 6(b) and 6(c) is conducted in the data conversion circuit 7. That is to say, each word composed of 12 bits ($A_o$, for example) as illustrated in FIG. 6(a) is divided into 4-bit groups ($A_{oa}$, $A_{ob}$, $A_{oc}$) as illustrated in FIG. 6(b). As illustrated in FIG. 6(c), data interchange is effected with 16 bits ($A_{oa}$, $A_{ob}$, $A_{oc}$, $C_{oa}$) taken as unit as follows. FIG. 6(d) corresponds to FIG. 5.

(1) Even-numbered data ($A_{oa}$, $A_{ob}$, $A_{oc}$, $C_{oa}$) of channels A and C are disposed in even-numbered data positions ($L_o'$) of the channel L.

(2) Odd-numbered data ($A_{1a}$, $A_{1b}$, $A_{1c}$, $C_{1a}$) of channels A and C are disposed in odd-numbered data positions ($L_1'$) of the channel L.

(3) Even-numbered data ($B_{oa}$, $B_{ob}$, $B_{oc}$, $D_{oa}$) of channels B and D are disposed in even-numbered data positions ($R_o'$) of the channel R.

(4) Odd-numbered data ($B_{1a}$, $B_{1b}$, $B_{1c}$, $D_{1a}$) of channels B and D are disposed in even-numbered data positions ($R_1'$) of the channel R.

In the conversion of FIG. 6, data of channels A and C are disposed in positions of the left channel, and data of channels B and D are disposed in positions of the right channel. However, other combinations are possible. For example, it is permitted to dispose data of channels A and B in positions of the channel L and dispose data of channels C and D in positions of the channel R.

Figure 7:
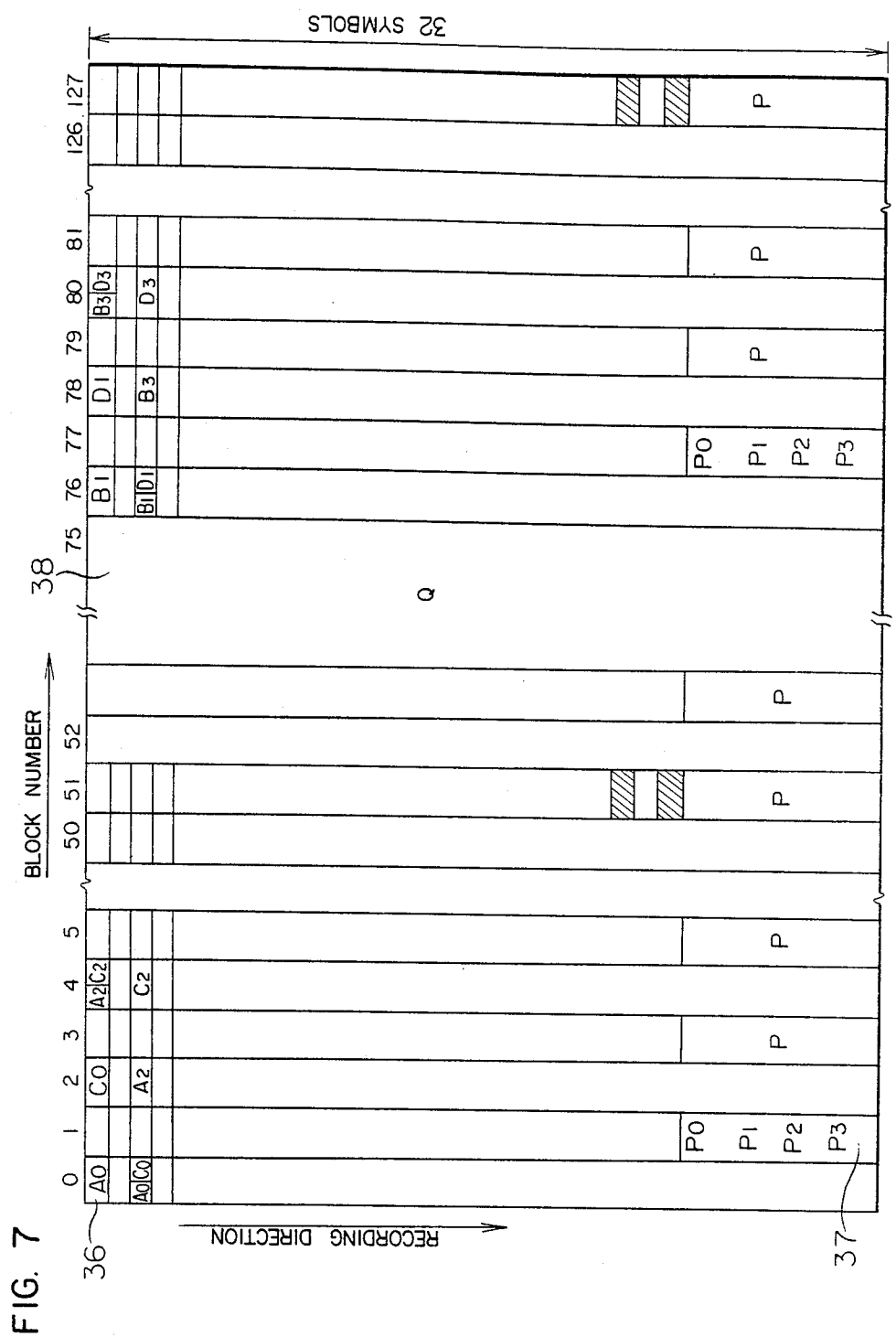
FIGS. 7 and 8 show the configuration of recorded data according to the present invention.
Figure 8:
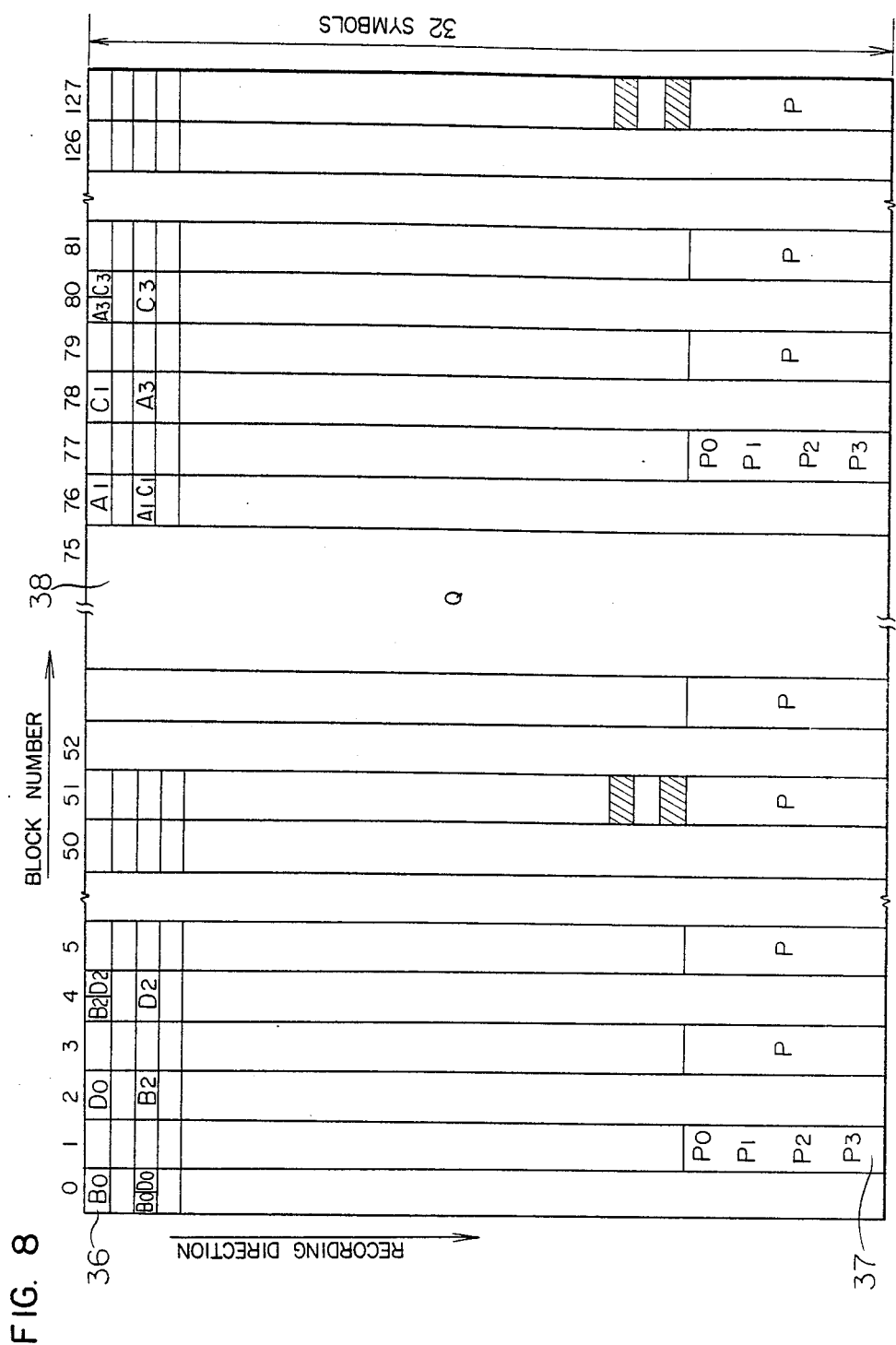

FIGS. 7 and 8 show the data configuration when the second PCM signal having a sampling frequency of 32 KHz, a quantization of 12 bits per sample, and four channels is recorded on the tape by using the conversion illustrated in FIG. 6. FIG. 7 shows the configuration of data recorded on the azimuth track 34 illustrated in FIG. 2. FIG. 8 shows the configuration of data recorded on the minus azimuth track 35 illustrated in FIG. 2. The data shown in FIGS. 7 and 8 correspond to the arrangement of FIG. 6(e). In the same way as FIGS. 3 and 4, even-numbered data and odd-numbered data of each channel are disposed on adjacent tracks and at a distance in the track direction. Even if consecutive errors on one track or consecutive errors on a half track extending over two tracks should happen, consecutive data in the time series does not become erroneous. Accordingly, mean value interpolation becomes possible. That is to say, an error can be compensated by using the mean value of data preceding and succeeding the erroneous data.

By using the conversion of FIG. 6, it is thus possible to record the second PCM signal having a sampling frequency of 32 KHz, a quantization of 12 bits per sample, and four channels. In addition, a data configuration optimum to burst errors can be obtained. In the reproduction operation, inverse conversion from FIG. 6(c) to FIG. 6(b) is carried out.

FIG. 9 shows an example of the configuration of the data conversion circuits 7 and 13. The circuit of FIG. 9 is composed of a RAM 45, an address switch circuit 46, an adder circuit 47, counters 49 and 50, and an offset generation circuit. FIG. 10 is a timing chart of input and output signals of the circuit illustrated in FIG. 9.

Data 40-1 supplied from an input terminal 40 is written into the RAM 45. The data read out of the RAM 45 is sent out from an output terminal 41 as data 41-1. Data conversion is effected by controlling the read address and write address of the RAM 45. The capacity of the RAM is 4 bits×21 words. A counter 49 is a 21-step counter which successively counts clock signals 43-1 supplied from an input terminal 43. The value contained in the counter 49 is used as the write address and the read address of the RAM 45. A counter 50 is a 48-step counter and represents the serial number of the supplied data. The counter 50 is reset at the beginning of conversion by a reset signal 44-1 supplied from an input terminal 44. The read address is controlled by adding in the adder circuit 47 the value of the counter 49 to an offset value sent out from the offset generation circuit 48 on the basis of the value of the counter 50. Numeral 42 denotes an input terminal for a data write control signal 42-1 of the RAM 45.

When the clock signal 43-1 is "1" as illustrated in the timing chart of input and output signals of FIG. 10, the address switch circuit 46 assumes the position connected to the counter 49. At the same time, the RAM write control signal 42-1 is supplied to the RAM 45 to write data therein. When the clock signal 43-1 is "0", the address switch circuit 46 is changed over to a position connected to the adder circuit 47 to read out data.

In the circuit of FIG. 9, it is possible to carry out both the data conversion of FIG. 6 and its inverse data conversion by changing the memory contents of the offset generation circuit 48.

Table 1 shows an example of input and output data and the address state of the RAM 45 during data conversion in the data conversion circuit of FIG. 9.

TABLE 1

| Input Data | Write Address | Read Offset | Read Address | Output Data |
|---|---|---|---|---|
| $A_0a$ | 0 | −14 | 7 | $D_{-2}b$ |
| $A_0b$ | 1 | −14 | 8 | $D_{-2}c$ |
| $A_0c$ | 2 | −12 | 11 | $A_{-1}c$ |
| $B_0a$ | 3 | −9 | 15 | $C_{-1}a$ |
| $B_0b$ | 4 | −9 | 16 | $C_{-1}b$ |
| $B_0c$ | 5 | −9 | 17 | $C_{-1}c$ |
| $C_0a$ | 6 | −13 | 14 | $B_{-1}c$ |
| $C_0b$ | 7 | −10 | 18 | $D_{-1}a$ |
| $C_0c$ | 8 | −10 | 19 | $D_{-1}b$ |
| $D_0a$ | 9 | −10 | 20 | $C_{-1}c$ |
| $D_0b$ | 10 | −10 | 0 | $A_0a$ |
| $D_0c$ | 11 | −10 | 1 | $A_0b$ |
| $A_1a$ | 12 | −10 | 2 | $A_0c$ |
| $A_1b$ | 13 | −7 | 6 | $C_0a$ |
| $A_1c$ | 14 | −11 | 3 | $B_0a$ |
| $B_1a$ | 15 | −11 | 4 | $B_0b$ |
| $B_1b$ | 16 | −11 | 5 | $B_0c$ |
| $B_1c$ | 17 | −8 | 9 | $D_0a$ |
| $C_1a$ | 18 | −6 | 12 | $A_1a$ |
| $C_1b$ | 19 | −6 | 13 | $A_1b$ |
| $C_1c$ | 20 | −6 | 14 | $A_1c$ |
| $D_1a$ | 0 | −3 | 18 | $C_1a$ |
| $D_1b$ | 1 | −7 | 15 | $B_1a$ |
| $D_1c$ | 2 | −7 | 16 | $B_1b$ |
| $A_2a$ | 3 | −7 | 17 | $B_1c$ |
| $A_2b$ | 4 | −4 | 0 | $D_1a$ |
| $A_2c$ | 5 | −19 | 7 | $C_0b$ |
| $B_2a$ | 6 | −19 | 8 | $C_0c$ |
| $B_2b$ | 7 | −4 | 3 | $A_2a$ |
| $B_2c$ | 8 | −4 | 4 | $A_2b$ |
| $C_2a$ | 9 | −20 | 10 | $D_0b$ |
| $C_2b$ | 10 | −20 | 11 | $D_0c$ |
| $C_2c$ | 11 | −5 | 6 | $B_2a$ |
| $D_2a$ | 12 | −5 | 7 | $B_2b$ |
| $D_2b$ | 13 | −15 | 19 | $C_1b$ |
| $D_2c$ | 14 | −15 | 20 | $C_1c$ |
| $A_3a$ | 15 | 0 | 15 | $A_3a$ |
| $A_3b$ | 16 | 0 | 16 | $A_3b$ |
| $A_3c$ | 17 | −16 | 1 | $D_1b$ |
| $B_3a$ | 18 | −16 | 2 | $D_1c$ |
| $B_3b$ | 19 | −1 | 18 | $B_3a$ |
| $B_3c$ | 20 | −1 | 19 | $B_3b$ |
| $C_3a$ | 0 | −16 | 5 | $A_2c$ |
| $C_3b$ | 1 | −13 | 9 | $C_2a$ |
| $C_3c$ | 2 | −13 | 10 | $C_2b$ |
| $D_3a$ | 3 | −13 | 11 | $C_2c$ |
| $D_3b$ | 4 | −17 | 8 | $B_2c$ |
| $D_3c$ | 5 | −14 | 12 | $D_2a$ |
| $A_4a$ | 6 | −14 | 13 | $D_2b$ |
| $A_4b$ | 7 | −14 | 14 | $D_2c$ |
| $A_4c$ | 8 | −12 | 17 | $A_3c$ |
| $B_4a$ | 9 | −9 | 0 | $C_3a$ |
| $B_4b$ | 10 | −9 | 1 | $C_3b$ |
| $B_4c$ | 11 | −9 | 2 | $C_3c$ |
| $C_4a$ | 12 | −13 | 20 | $B_3c$ |
| $C_4b$ | 13 | −10 | 3 | $D_3a$ |
| $C_4c$ | 14 | −10 | 4 | $D_3b$ |
| $D_4a$ | 15 | −10 | 5 | $D_3c$ |
| $D_4b$ | 16 | −10 | 6 | $A_4a$ |
| $D_4c$ | 17 | −10 | 7 | $A_4b$ |
| $A_5a$ | 18 | −10 | 8 | $A_4c$ |
| $A_5b$ | 19 | −7 | 12 | $C_4a$ |
| $A_5c$ | 20 | −11 | 9 | $B_4a$ |
| $B_5a$ | 0 | −11 | 10 | $B_4b$ |
| $B_5b$ | 1 | −11 | 11 | $B_4c$ |
| $B_5c$ | 2 | −8 | 15 | $D_4a$ |

Data conversion effected in the data conversion circuit 7 during the recording operation is shown in Table 1. Data conversion during the reproduction can be similarly effected in the data conversion circuit 13. The write address is the value of the counter 49. The read address is obtained by adding the offset value to the write address. The addition of the offset value to the write address in the adder circuit 47 is addition, modulo 21.

By using the present invention heretofore described, it is possible to record the second PCM signal having a sampling frequency of 32 KHz, a quantization of 12 bits per sample, and four channels in a data configuration optimum to burst errors.

In the above described embodiment, the rotary-head type DAT is used. It is also possible to cope with a fixed-head type DAT by using a similar conversion. Even if input and output signals are digital signals, they can be handled with no problem by configuring the input and output signal as shown in FIG. 6(a).

What is claimed is:

1. A PCM signal recording method for recording an input PCM signal having a quantization of m bits per sample and n channels as a recording PCM signal having m' bits per channel and n' channels, comprising the steps of:
   dividing said PCM signal having n channels into n' combinations:
   dividing said PCM signal in each of said n' combinations into k-bit data units;
   converting each k-bit data unit into a signal having a quantization of m' bits per sample in one channel; and
   arranging data contained in said signal having m' bits in one channel to correspond to each of said n' channels.

2. A PCM signal reproducing method comprising:
   converting k-bit data units recorded by said PCM signal recording method according to claim 1 into a PCM signal having a quantization of m bits per sample and n' channels while taking n×m bits as a unit; and
   reproducing the converted PCM signal.

3. A PCM recording and/or reproducing method according to claim 2, wherein said m bits, n channels, n' channels and k bits are respectively 12 bits, 4 channels, 2 channels and 4 bits, and wherein two 8-bit data are formed by extracting 8 bits from each channel of the PCM signal having a quantization of 12 bits per sample and 4 channels, and 8-bit data is formed from 4 bits of 2 channels.

4. A PCM recording and/or reproducing method according to claim 1, wherein said m bits, n channels, n' channels and k bits are respectively 12 bits, 4 channels, 2 channels and 4 bits, and wherein two 8-bit data are formed by extracting 8 bits from each channel of the PCM signal having a quantization of 12 bits per sample and channels, and one 8-bit data is formed from 4 bits of 2 channels.

5. A PCM signal recording and/or reproducing method according to claim 4, wherein PCM signals are recorded on a magnetic recording medium by a rotary head for recording on 2 tracks taken as a unit, and wherein a first PCM signal included in two PCM signals resulting from halving a PCM signal into 2 channels is recorded on a former half of a first track included in said 2 tracks with respect to the record direction and on a latter half of a second track, and a second PCM signal is recorded on a former half of said second track and on a latter half of said first track.

6. A PCM signal recording and/or reproducing method according to claim 5, wherein even-numbered data (or odd-numbered data) are recorded on former halves of respective tracks and odd-numbered data (or even-numbered data) are recorded on latter halves of respective tracks.

7. A PCM signal recording and/or reproducing method according to claim 3, wherein PCM signals are recorded on a magnetic recording medium by a rotary head for recording on 2 tracks taken as a unit, and wherein a first PCM signal included in two PCM signals resulting from halving a PCM signal into 2 channels is recorded on a former half of a first track included in said 2 tracks with respect to the record direction and on a latter half of a second track, and a second PCM signal is recorded on a former half of said second track and on a latter half of said first track.

8. A PCM signal recording and/or reproducing method according to claim 7, wherein even-numbered data (or odd-numbered data) are recorded on former halves of respective tracks and odd-numbered data (or even-numbered data) are recorded on latter halves of respective tracks.

9. A PCM signal recording and reproducing apparatus for recording and reproducing a PCM signal having a sampling frequency $f_s$, a quantization of m bits per sample, and n channels, $f_s$, m and n being positive integers, including a data conversion unit having means for dividing a PCM signal having a sampling frequency of $b/a \times f_s$, a quantization of $d/c \times m$ bits per sample, and $(a \times c)/(b \times d) \times n$ channels into i-bit groups, i being the least common multiple of $2 \times m \times n$ bits and $2 \times m \times n \times a/b$ bits and a, b, c, and d being positive integers, and means for interchanging the data sequence of said i-bit groups, while taking m/c bits as a unit, to match an even-numbered word and an odd-numbered word of each channel included in said i-bit data respectively with an even-numbered word position and an odd-numbered word position of each channel of said PCM signal having a sampling frequency $f_s$, a quantization of m bits per sample, and n channels.

10. A PCM signal recording and reproducing apparatus according to claim 9, wherein $f_s$ is 48 KHz, m is 16 bits, and n, a, b, c and d are 2, 3, 2, 4 and 3, respectively.

* * * * *